United States Patent
Abhyankar et al.

(10) Patent No.: US 12,450,517 B2
(45) Date of Patent: Oct. 21, 2025

(54) QUANTUM COMPUTING ASSISTED REDUCTION OF CARBON FOOTPRINT

(71) Applicant: Accenture Global Solutions Limited, Dublin (IE)

(72) Inventors: Atul Abhyankar, Pune (IN); Payal Panda, Bangalore (IN); Samanwita Majumdar, Kolkata (IN); Nishikanta Panda, Bangalore (IN); Swaroop Prasad Bhongade, Mumbai (IN); Shruti Sudhakar Marathe, Mumbai (IN); Shaista Firdose, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 417 days.

(21) Appl. No.: 18/155,443

(22) Filed: Jan. 17, 2023

(65) Prior Publication Data

US 2024/0242104 A1    Jul. 18, 2024

(51) Int. Cl.
*G06N 10/60* (2022.01)
*G06F 3/0482* (2013.01)
(Continued)

(52) U.S. Cl.
CPC ........... *G06N 10/60* (2022.01); *G06F 3/0482* (2013.01); *G06F 3/0484* (2013.01);
(Continued)

(58) Field of Classification Search
CPC ..... G06N 10/60; G06F 40/134; G06F 40/166; G06F 40/40; G06F 40/20; G06F 3/0482; G06F 3/0484
See application file for complete search history.

(56) References Cited

U.S. PATENT DOCUMENTS

| 2017/0353477 A1* | 12/2017 | Faigon | G06F 21/554 |
| 2019/0349400 A1* | 11/2019 | Bruss | G06F 21/53 |
| 2020/0396190 A1* | 12/2020 | Pickman | H04L 67/306 |

OTHER PUBLICATIONS

Dada, Emmanuel Gbenga, et al. "Machine learning for email spam filtering: review, approaches and open research problems." Heliyon 5.6 (Year: 2019).*

(Continued)

*Primary Examiner* — Shahid K Khan
(74) *Attorney, Agent, or Firm* — Seed Intellectual Property Law Group LLP

(57) ABSTRACT

The present disclosure describes a system and method for applying classical machine learning together with quantum machine learning to extract features from a draft email and from metadata of the draft email to identify issues that can influence the carbon emissions caused by the draft email upon sending. The system and method can further determine specific modifications for the draft email that can reduce the carbon emissions caused by the draft email upon sending. The system and method can offer the user with a selection to have the draft email automatically modified to reduce carbon emissions. The method may further include analysis of job profiles and behaviors of individual employees to determine whether the draft email is relevant to the recipients in the "to:" field of the draft email, as well as to provide analytics related to carbon emissions associated with emailing and printing behaviors of employees.

17 Claims, 10 Drawing Sheets

(51) Int. Cl.
G06F 3/0484 (2022.01)
G06F 40/134 (2020.01)
G06F 40/166 (2020.01)
G06F 40/20 (2020.01)
G06F 40/40 (2020.01)

(52) U.S. Cl.
CPC .......... *G06F 40/134* (2020.01); *G06F 40/166* (2020.01); *G06F 40/20* (2020.01); *G06F 40/40* (2020.01)

(56) References Cited

OTHER PUBLICATIONS

Basheer, Afrad, A. Afham, and Sandeep K. Goyal. "Quantum $ k $-nearest neighbors algorithm." arXiv preprint arXiv:2003.09187 (Year: 2020).*

Stringhini, Gianluca, and Olivier Thonnard. "That ain't you: Blocking spearphishing through behavioral modelling." International Conference on Detection of Intrusions and Malware, and Vulnerability Assessment. Cham: Springer International Publishing (Year: 2015).*

Dutta, "Quantum Machine Learning—The Next Big Thing", Jan. 17, 2021; https://medium.com/swlh/quantum-machine-learning-the-next-big-thing-95bfc3b4f08f.

Lashmanan, "What is quantum computing? And How quantum computers work", Oct. 22, 2021 ; https://blog.r2c.io/what-is-quantum-computing-and-how-quantum-computers-work/.

Dang et al., "Image Classification Based on Quantum KNN Algorithm", May 16, 2018; Beijing University of Technology; https://arxiv.org/pdf/1805.06260v1.pdf.

Youtube channel Domaine of Science, "The Map of Quantum Computing—Quantum Computers Explained", Dec. 3, 2021; https://www.bing.com/videos/search?q=Quantum+computing +wikipedia &docid=607998972390087750&mid= 575B2328497BA3B6FBAC575B2328497BA3B6FBAC&view= detail&FORM=VIRE.

https://qiskit-quantum-knn.readthedocs.io/en/latest/_modules/qiskit_quantum_knn/qknn/qkneighborsclassifier.html.

Flexible Representation of Quantum Images (FRQI) and Novel Enhanced Quantum Representation (NEQR), https://learn.qiskit.org/course/ch-applications/flexible-representation-of-quantum-images-frqi.

* cited by examiner

CONFIRM THE RECIPIENTS AND ATTACHMENTS

REVIEW ALL THE RECIPIENTS BEFORE SENDING. THE ONES LISTED BELOW ARE NOT PART OF YOUR CURRENT TEAM. EACH ID ADDS 4GM TO THE $CO_2$ CONTENT.

YOU CAN RESIZE YOUR INLINE IMAGE USING THE FOLLOWING LINK TO SAVE 34 GM OF $CO_2$

THE ATTACHMENT FILES CAN BE PLACED IN THE FOLLOWING LINK AND THAT WILL SAVE 76 GM OF $CO_2$

☐ SELECT THE RECIPIENTS WHO NEED THE INFORMATION

☐ EMPLOYEE2@NOMAIL.NET — ADD
☐ EMPLOYEE3@NOMAIL.NET — ADD
☐ EMPLOYEE4@NOMAIL.NET — ADD
☐ EMPLOYEE5@NOMAIL.NET — ADD
☐ EMPLOYEE6@NOMAIL.NET — ADD
☐ EMPLOYEE7@NOMAIL.NET — ADD

MANAGE ALLOWED DOMAINS
MANAGE ALLOWED EMAIL ADDRESSES
MANAGE ATTACHMENTS

[GREEN BEHAVIOR GUIDANCE]   [SEND]   [CANCEL]

FIG. 3

| | | | | INDIVIDUAL EMPLOYEE DATA | | | | | |
|---|---|---|---|---|---|---|---|---|---|
| EMP ID | EMP NAME | DATE AND TIME | DEPT. | MAIL SIZE | STAND./ SPAM MAIL | GROUP/ SINGLE MAIL | NO. OF RECIP. | MAIL ATTACH. | NO. OF PRINTOUTS | JOB PROFILE |
| 12057234 | DANIEL | 2022-05-04 21:13:49 | HR-RECRUIT. | 144KB | SPAM | GROUP | 55 | YES | 3 | BOARD OF DIRECTORS |
| 13205364 | SCOTT | 2022-05-04 21:13:49 | HR-TRAINING | 10KB | HAM | GROUP | 10 | NO | 16 | CHIEF EXEC. OFFICER |
| 12953679 | ELISA | 2022-05-04 21:13:49 | IT-SECURITY | 8KB | SPAM | SINGLE | 1 | YES | 2 | GENERAL MANAGER |
| 12557815 | ALEX | 2022-05-04 21:13:49 | IT-NETWORK. | 2MB | HAM | SINGLE | 1 | YES | 0 | ASST. GEN. MANAGER |
| 13511890 | PHILIP | 2022-05-04 21:13:49 | IT-DEVELOP. | 178MB | SPAM | GROUP | 29 | NO | 1 | CLER. STAFF MEMBER |

| | | INDIVIDUAL EMPLOYEE CARBON FOOTPRINT | | |
|---|---|---|---|---|
| EMP ID | EMP NAME | DATE | DEPT. | CARBON FOOTPRINT |
| 12057234 | DANIEL | 2022-05-04 | HR-RECRUIT. | 475 G CO2 |
| 13205364 | SCOTT | 2022-06-04 | HR-TRAINING | 150 G CO2 |
| 12953679 | ELISA | 2022-07-04 | IT-SECURITY | 75 G CO2 |
| 12557815 | ALEX | 2022-08-04 | IT-NETWORK. | 175 G CO2 |
| 13511890 | PHILIP | 2022-09-04 | IT-DEVELOP. | 20 G CO2 |

| INDIVIDUAL EMPLOYEE TRENDS ||||
|---|---|---|---|
| EMP ID | MONTH | CARBON FOOTPRINT | TREND |
| 12057234 | JAN | 2300 G CO2 | UPTREND |
| 12057234 | FEB | 2450 G CO2 | DOWNTREND |
| 12057234 | MAR | 1850 G CO2 | STATIONARY TREND |
| 12057234 | APR | 4335 G CO2 | SEASONAL TREND |

| DEPARTMENT TRENDS ||||
|---|---|---|---|
| DEPT. | MONTH | CARBON FOOTPRINT | TREND |
| IT-SECURITY | JAN | 9600 G CO2 | UPTREND |
| IT-SECURITY | FEB | 6750 G CO2 | DOWNTREND |
| IT-SECURITY | MAR | 9850 G CO2 | STATIONARY TREND |
| IT-SECURITY | APR | 8835 G CO2 | SEASONAL TREND |

FIG. 12

QUANTUM COMPUTING ASSISTED REDUCTION OF CARBON FOOTPRINT

TECHNICAL FIELD

The present disclosure generally relates to a system for reducing the carbon footprint of emails. More specifically, the present disclosure generally relates to applying machine learning and quantum computing to calculate carbon emissions for draft emails and modifying draft emails to reduce carbon emissions.

BACKGROUND

Emails impact the environment by requiring data centers to store information. Data centers consume energy causing carbon emissions. Thus, the quantity of data in each email impacts the amount of energy consumed, which causes carbon emissions. Additionally, printing emails causes carbon emissions. Due to these issues, various email characteristics can multiply the impact emails have on the environment. For example, the following are common behaviors adding to carbon emissions: sending bulk replies without validating recipients; sharing large sized files; sending inline mail content to multiple users; failing to validate if email needs to be sent; failing to clear inbox (junk/spam and unread mail); failing to unsubscribe from nonessential mailing lists; sending emails during off hours; and failing to respond immediately. Currently, email users do not know the impact of the emails they send at the time of drafting and email systems lack integrated guidance for modifying emails to reduce carbon emissions.

There is a need in the art for a system and method that modifies emails to reduce the carbon emissions of emails.

SUMMARY

The present disclosure describes a system and method for applying machine learning and quantum computing to analyze the carbon emissions of emails and the factors impacting the carbon emissions of emails, as well as to determine appropriate modifications that reduce the carbon emissions of emails. The system solves the problems discussed above by providing a way to notify a user/sender immediately before sending an email of specific modifications that can be made to a draft email to reduce carbon emissions. The draft email may be an email that a user is currently drafting.

The system can also provide a way for the user/sender to select automatic implementation of the specific modifications. The system and method improve efficiency by converting email log description of draft emails a user/sender is currently drafting to text feature vectors and applying multiple classical machine learning processes to the text feature vectors, rather than redundantly converting email log description of draft emails to text feature vectors one time for a first classical machine learning process and a second time for a second classical machine learning process. Furthermore, processing speed is greatly increased by applying quantum computing to an image of the draft email to determine whether the draft email includes an attached file. The speed of simultaneously applying quantum computing with text analysis involving classical processes helps make it possible to immediately provide the user/sender with carbon emissions information and recommendations for reducing carbon emissions, such that the user/sender is notified before sending the draft email and modifications may be made before sending the draft email.

In one aspect, the disclosure provides a computer-implemented method of generating sustainability scores and curating product recommendations based on the sustainability scores. The method may include receiving an image of a draft email and an email log description of the draft email. The method may include applying a first trained classical machine learning model to the email log description to classify draft emails as including a single email address or a group email address in a "to:" field. The method may include applying a second trained classical machine learning model to the email log description to classify the draft email as spam or a standard email. The method may include applying a trained quantum K nearest-neighbor (QKNN) machine learning model to classify the draft email as containing an attachment or not containing an attachment. The method may include, based on output from the first trained classical machine learning model, the second trained classical machine learning model, and the trained QKNN machine learning model, determining one or more modifications that can be made to the draft email to reduce carbon emissions. The method may include calculating a quantity of carbon emissions corresponding with each of the one or more modifications. The method may include presenting to a user, via a display of a user interface, the determined one or more modifications with the calculated quantity of carbon emissions.

In another aspect, the disclosure provides a non-transitory computer-readable medium storing software comprising instructions executable by one or more computers which, upon such execution, cause the one or more computers to: (1) receive an image of a draft email and an email log description of the draft email; (2) apply a first trained classical machine learning model to the email log description to classify draft emails as including a single email address or a group email address in a "to:" field; (3) apply a second trained classical machine learning model to the email log description to classify the draft email as spam or a standard email; (4) apply a trained quantum K nearest-neighbor (QKNN) machine learning model to classify the draft email as containing an attachment or not containing an attachment; (5) based on output from the first trained classical machine learning model, the second trained classical machine learning model, and the trained QKNN machine learning model, determine one or more modifications that can be made to the draft email to reduce carbon emissions; (6) calculate a quantity of carbon emissions corresponding with each of the one or more modifications; and (7) present to a user, via a display of a user interface, the determined one or more modifications with the calculated quantity of carbon emissions.

In another aspect, the disclosure provides a machine learning and quantum computing based system for reducing carbon emissions by modifying emails, the system comprising one or more computers and one or more storage devices storing instructions that are operable, when executed by the one or more computers, to cause the one or more computers to: (1) receive an image of a draft email and an email log description of the draft email; (2) apply the first trained classical machine learning model to the email log description to classify draft emails as including a single email address or a group email address in a "to:" field; (3) apply the second trained classical machine learning model to the email log description to classify the draft email as spam or a standard email; (4) apply a trained quantum K nearest-neighbor (QKNN) machine learning model to classify the draft email as containing an attachment or not containing an attachment; (5) based on output from the first trained classical machine learning model, the second trained classical machine learning model, and the trained QKNN machine learning model, determine one or more modifications that can be made to the draft email to reduce carbon emissions; (6) calculate a quantity of carbon emissions corresponding with each of the one or more modifications; and (7) present to a user, via a display of a user interface, the determined one or more modifications with the calculated quantity of carbon emissions.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 shows a message box presented to a user on a display of a user interface, according to an embodiment.

FIG. 9 is a display of analytics, according to an embodiment.

FIG. 10 is a display of analytics, according to an embodiment.

FIG. 11 is a display of analytics, according to an embodiment.

FIG. 12 is a display of analytics, according to an embodiment.

DESCRIPTION OF EMBODIMENTS

The disclosed system and method apply machine learning and quantum computing to evaluate features of draft emails (e.g., based on images of draft emails or email log description of draft emails) to calculate the emissions the draft emails would cause if sent and to determine modifications to the draft emails for reducing the carbon emissions caused by the draft emails before the draft emails are sent. In some embodiments, the draft emails may be automatically modified to reduce carbon emissions before the draft emails are sent. The system may apply quantum computing to determine whether attachments are included in the draft email and may also determine the size of the attachment and/or the carbon emissions caused by the attachment. In this way, the disclosed system and method may provide a real time analysis of the carbon emissions a draft email is estimated to cause, so that either the user can be provided with the carbon emission data and recommendations for modifications to the email to reduce the carbon emissions caused by the draft email or the system can automatically make such modifications. Real time analysis and determination of actions that can reduce carbon emissions (whether recommended or automatically implemented) can enable quick intervention before a user sends out the email. This way, a user can be stopped before sending out emails that cause more carbon emissions that necessary. While the examples discussed with reference to FIGS. 1-10 are related to embodiments in which the feature of the emails are related to carbon emissions, it is understood that other features may be the focus of other embodiments.

The machine learning and quantum computing based system for reducing carbon emissions by modifying emails can analyze the body of a draft email, conduct an attachment/image pattern study, conduct work history analysis, conduct work history analysis, identify mailing subscriptions, determine mail category (e.g., urgent/escalations/information/repetitive), and identify spam (e.g., junk email with mass invitation).

Figure 1:
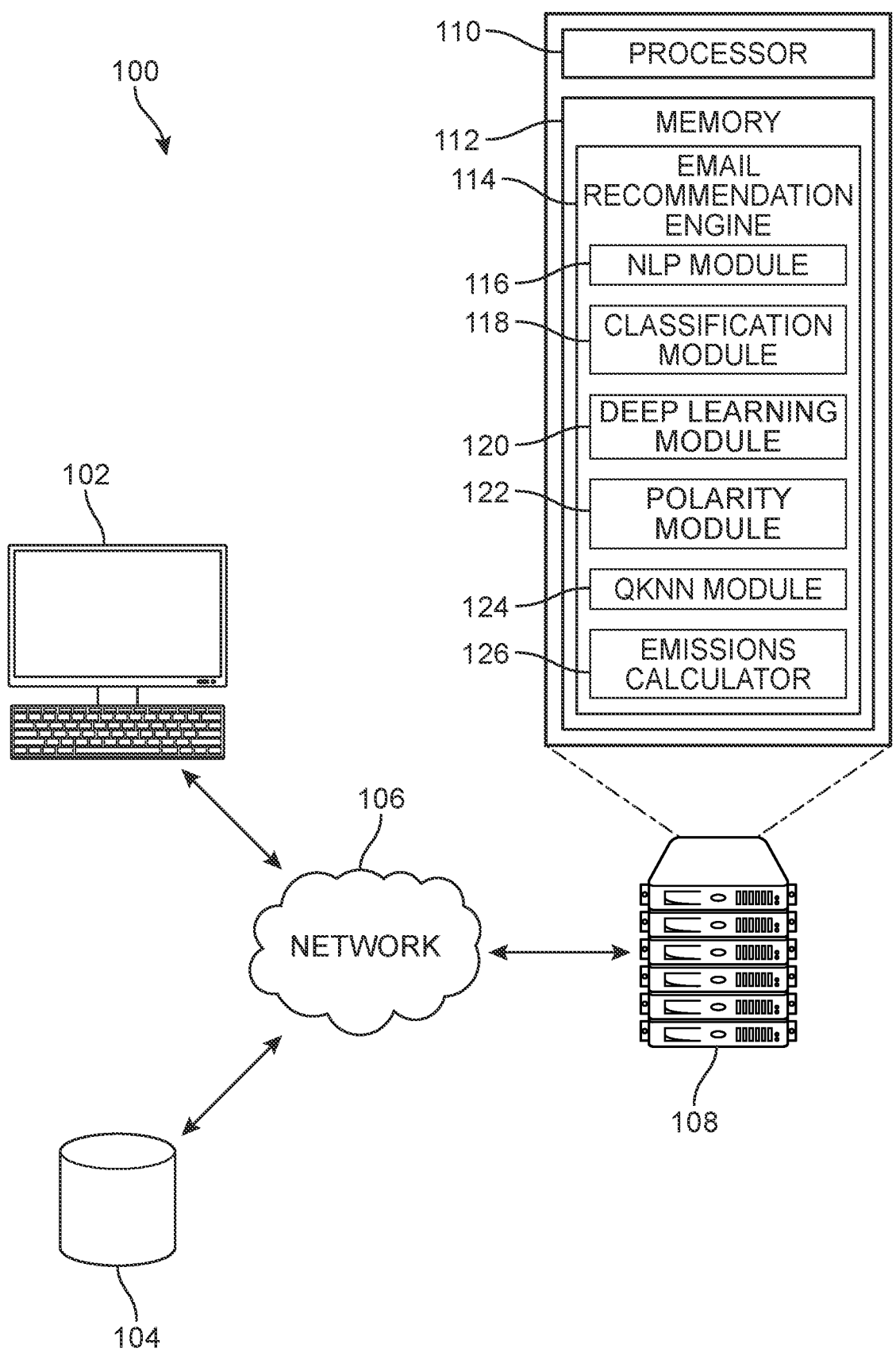
FIG. 1 is a schematic diagram of a machine learning and quantum computing based system for reducing carbon emissions by modifying emails, according to an embodiment.

FIG. 1 is a schematic diagram of a machine learning and quantum computing based system for reducing carbon emissions by modifying emails 100 (or system 100), according to an embodiment. The disclosed system may include a plurality of components capable of performing the disclosed computer-implemented method for reducing carbon emissions by applying classical machine learning and quantum computing to modify emails (e.g., method 500). For example, system 100 includes a user device 102, a computing system 108, a network 106, and a database 104.

The components of system 100 can communicate with each other through network 106. For example, user device 102 may access data from database 104 via network 106. In some embodiments, network 106 may be a wide area network ("WAN"), e.g., the Internet. In other embodiments, network 106 may be a local area network ("LAN"). One or more resources of a virtual agent may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

As shown in FIG. 1, an email recommendation/modification engine 114 may be hosted in computing system 108, which may have a memory 112 and a processor 110. Processor 110 may include a single device processor located on a single device, or it may include multiple device processors located on one or more physical devices. Memory 112 may include any type of storage, which may be physically located on one physical device, or on multiple physical devices. In some cases, computing system 108 may comprise one or more servers that are used to host email recommendation/modification engine 114. Email recommendation/modification engine 114 may include NLP module 116, classification module 118, deep learning module 120, Polarity module 122, QKNN module 124, and emissions calculator 126. Database 104 may store data that may be retrieved by other components for system 100. For example, database 104 may store draft email data and metadata (e.g., log description of emails in comma-separated value (CSV) format) and/or employee data. Nonlimiting examples of metadata one or more recipients the draft email lists in the "to:" field or the "cc:" field, the time the draft email was created, the sender of the draft email, and/or the subject line of the draft email. As discussed with respect to FIG. 6, database 104 may include an arrangement of multiple databases.

The user may include an individual using the disclosed system to draft an email, obtain recommendations for reducing emissions caused by the draft email, and/or automatically modify a draft email to reduce emissions the draft email causes. While FIG. 1 shows a single user device, it is understood that more user devices may be used. For example, in some embodiments, the system may include two or three user devices. The user device may be a computing device used by a user for communicating with the system. In some embodiments, one or more of the user devices may include a laptop computer, a smartphone, or a tablet computer. In other embodiments, one or more of the user devices may include a desktop computer and/or another type of computing device. The user devices may be used for inputting, processing, and displaying information. The user device may include a display that provides a user interface for the user to input and/or view information.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

Embodiments may also include one or more computers and one or more storage devices storing instructions that are operable, when executed by the one or more computers, to cause the one or more computers to perform the disclosed methods.

Figure 2:
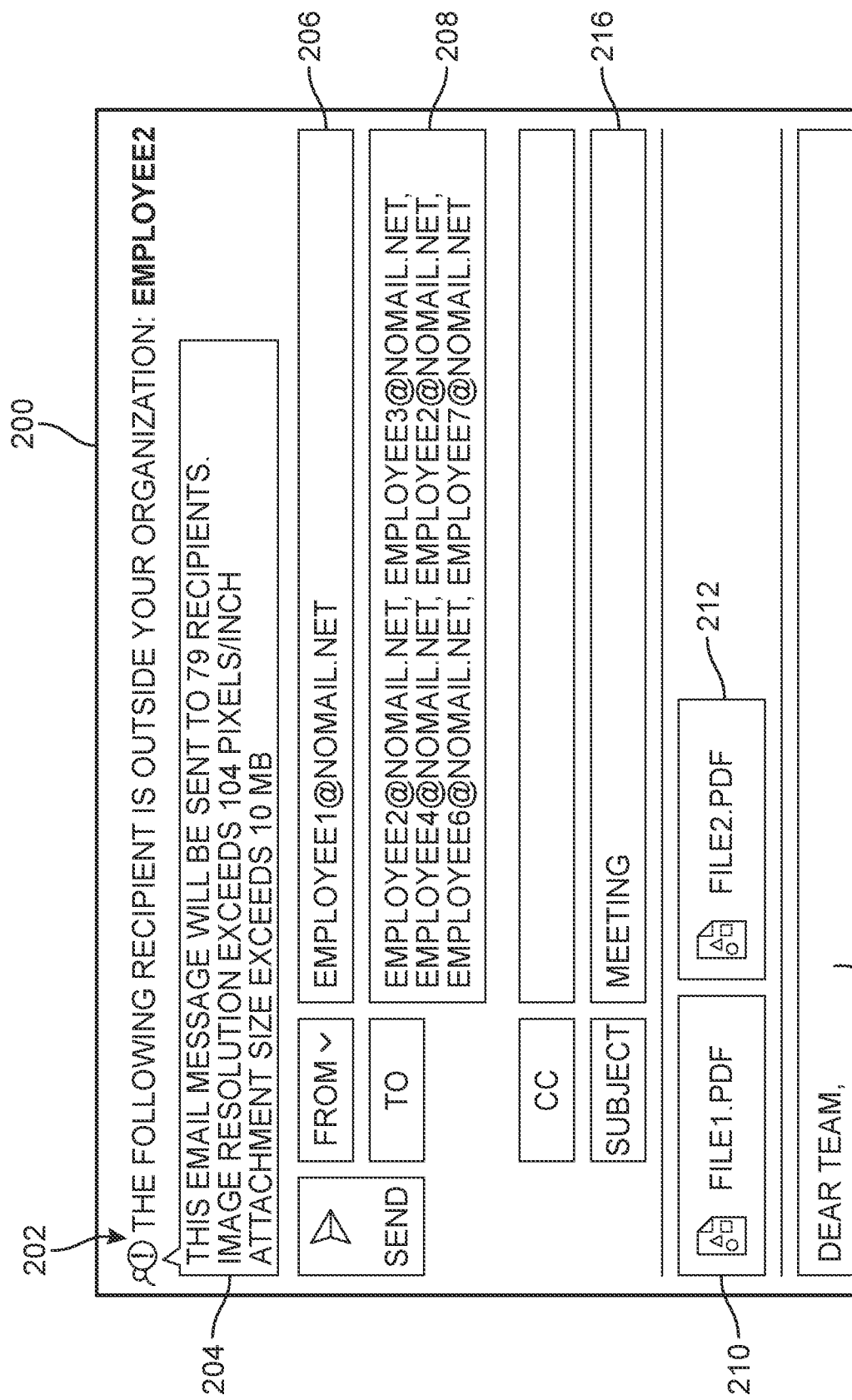
FIG. 2 demonstrates presentation of recommendations to a user based on analysis of various draft email features and/or employee data, according to an embodiment.

FIG. 2 demonstrates presentation of recommendations to a user based on analysis of various draft email features and/or employee data, according to an embodiment. In some embodiments, the recommendation may be provided by an email recommendation and modification plugin that is installed on top of the email system, such that the email recommendation and modification is integrated with the email system. In this way, the email recommendation and modification can seamlessly provide the user with carbon emissions information, recommendations, and automatic modification. FIG. 2 shows a draft email 200 having a "from:" field 206, a "to:" field 208, a subject line 16, and a body 214. A message 202 accompanies draft email 200. Message 202 states that "the following recipient is outside your organization: Employee2." Message 202 is intended to notify the user with a reason why the draft email may not be relevant to Employee2. A message box 204 may pop up once an email is drafted. Message box 204 provides a message stating the email will be sent to 79 recipients. This message is intended to make the user aware of the high number of recipients, so that the user can consider removing recipients to reduce the carbon emissions caused by the draft email. Message box 204 may include a message stating that the email includes an image (not shown) having a resolution exceeding 104 pixels/inch. This message is intended to make the user aware of the high resolution, so that the user can consider changing the resolution to reduce the carbon emissions caused by the draft email.

Draft email 200 may include a first attachment 210 and a second attachment 212. Message box 204 may include a message stating that the email includes an attachment having a size exceeding 10 MB. This message is intended to make the user aware of the large size of the attachment, so that the user can consider removing the attachment (and optionally including a link to a shared location where the attachment can be accessed by recipients) to reduce the carbon emissions caused by the draft email.

The recommendations may dynamically change in response to adjustments made to the draft email. For example, the display presented to the user on a display of a user interface may dynamically change in response to the addition or removal of an attachment or changing from including an attachment to providing a link to a shared drive where the file that was previously attached is saved. In another example, the display presented to the user on a display of a user interface may dynamically change in response to the addition or removal of a recipient. For example, when at least one of the determined one or more modifications is removal of one or more recipients in the draft email, the method may include, modifying the draft email to remove one or more recipients in a draft email "to:" field, and upon modification, presenting to a user, via a display of a user interface, the amount of carbon emissions conserved by this removal and/or the quantity of carbon emissions corresponding to the modified draft email. In another example, the calculated and displayed carbon emissions associated with elements/features of the draft email may change in response to the elements/features of the draft emails changing. In this way, the user can see in real time how modifications to the draft email can impact carbon emissions. In some embodiments, the user may have the opportunity to select recommended modifications to the email.

In yet another example, when at least one of the determined one or more modifications includes removal of one or more attachments in a draft email and replacing the removed attachments with a link to a shared location where the files from the one or more attachments are saved, the method may include, modifying the draft email to remove of one or more attachments in the draft email and replacing the removed attachments with a link to a shared location where the files from the one or more attachments are saved, and upon modification, presenting to a user, via a display of a user interface, the amount of carbon emissions conserved by this removal and replacement of the one or more attachments and/or the quantity of carbon emissions corresponding to the modified draft email.

FIG. 3 shows a message box 300 presented to a user on a display of a user interface, according to an embodiment. In some embodiments, message box 300 may be displayed to the user along with draft email 200 and may include messages related to the messages shown with draft email 200, discussed above with respect to FIG. 2. In this way, the message can provide features of the draft email that the user may want to consider changing to reduce carbon emissions and may provide easy ways to modify the draft email (e.g., selection boxes and clickable links). Message box 300 may appear (e.g., as a popup window) that asks the user to review all recipients before sending, informs the user that the recipients listed below are not part of the user's current team, and further informs the user of the carbon emissions associated with including each recipient in the email at 302. A message 304 may inform a user that the user can click on a link provided with the message to resize an inline image in the draft email and may also provide the quantity of carbon emissions that could be saved by resizing the image in the recommended/suggested manner. In one example, selecting (e.g., clicking on) the link in the message may initiate automatically resizing the inline image in the draft email. Automatically resizing the inline image may be performed, for example, by applying a library, such as a Python library automatically in response to the user/sender selecting the link.

A message 306 may provide a user with the opportunity to place attachments in a shared location by clicking on a link provided with the message and also may provide the quantity of carbon emissions that could be saved by moving the attachment in the recommended/suggested manner. By clicking on the link, the attached file (attachment) may be stored in a shared location and an attachment link to the file may be generated in the draft email. For example, in some embodiments, selecting (e.g., clicking on) the link in the message may initiate automatically creating a folder dynamically in a shared location with read access enabled for all recipients (e.g., under a Quancom default directory). The shared location may be internal to an organization (e.g., a particular drive in a network) or may be web or cloud based (e.g., SharePoint by Microsoft or DropBox). Once the folder is created, the attached file (attachment) may be automatically saved in the created folder and a link to the file may be created in the draft email. These processes related to replacing an attached file with a link to a shared location in which the attached file is stored may be performed for multiple attached files and may also be performed automatically in response to the user/sender selecting the link. The sender may later move the attached file(s) out of the shared location if desired. Once the draft email is finalized and sent, and the recipient receives the email, the recipient can click on the attachment link to access the file in the shared location.

Message box 300 provides a user with a list of recipients 308 that are not part of the user's team. In the example shown in FIG. 3, the message may provide selection boxes that the user can click on to select recipients to add to the draft email. It is understood that other modes of input may be used. For example, in other embodiments, a pulldown menu may list recipients for users to select from.

Message box 300 may include selections for managing various aspects of the draft email. For example, message box 300 may include a first selection 310 for managing allowed domains, which may be selected (e.g., single or double clicked) to manage which domains identified in the recipients are included in the draft email. Message box 300 may include a second selection 312 for managing allowed attachment, which may be selected (e.g., single or double clicked) to manage which attachments are included in the draft email and in what format the attachments are included (e.g., as a file attached to the email or as a link to a shared location where the attachment is saved). Message box 300 may include a third selection 314 for managing allowed email boxes, which may be selected (e.g., single or double clicked) to manage which email addresses identified in the recipients are included in the draft email. Message box 300 may include a fourth selection 316 for green behavior guidance, which may be selected (e.g., single or double clicked) to read about modifications that can be made to emails to reduce emissions. Message box 300 may include a send button 318 and a cancel button 320 that may be selected to send or cancel the email, respectively.

In some embodiments, modifications to the draft email may be automatically made. In some such embodiments, the draft email may be modified based on the results of analysis after prompting the user to select/verify the modification. For example, the method may include prompting the user to select at least one of determined one or more modifications. The method may further include, upon selection of the at least one of determined one or more modifications, automatically implementing the modification to the draft email. In other embodiments, the draft email may be automatically modified based on the results of analysis without requiring action by the user. The modifications may include, for example, adding or removing attachments. In another example, the modification may alternatively or additionally include adding or removing recipients. In yet another example, the modification may alternatively or additionally include switching from including an attachment to providing a link to a shared drive where the file that was previously attached is saved. In a further example, the modification may include resizing an in-line image in the draft email.

The message may include an option (e.g., link) to manage allowed domains. The message may include an option (e.g., link) to manage allowed domains. The message may include an option (e.g., link) to manage attachments. The message may include an option (e.g., link) to read a statement about green behavior guidance. The message may also include an option (e.g., button) to send or cancel the email after considering and possibly selecting modification to the draft email.

Figure 4:
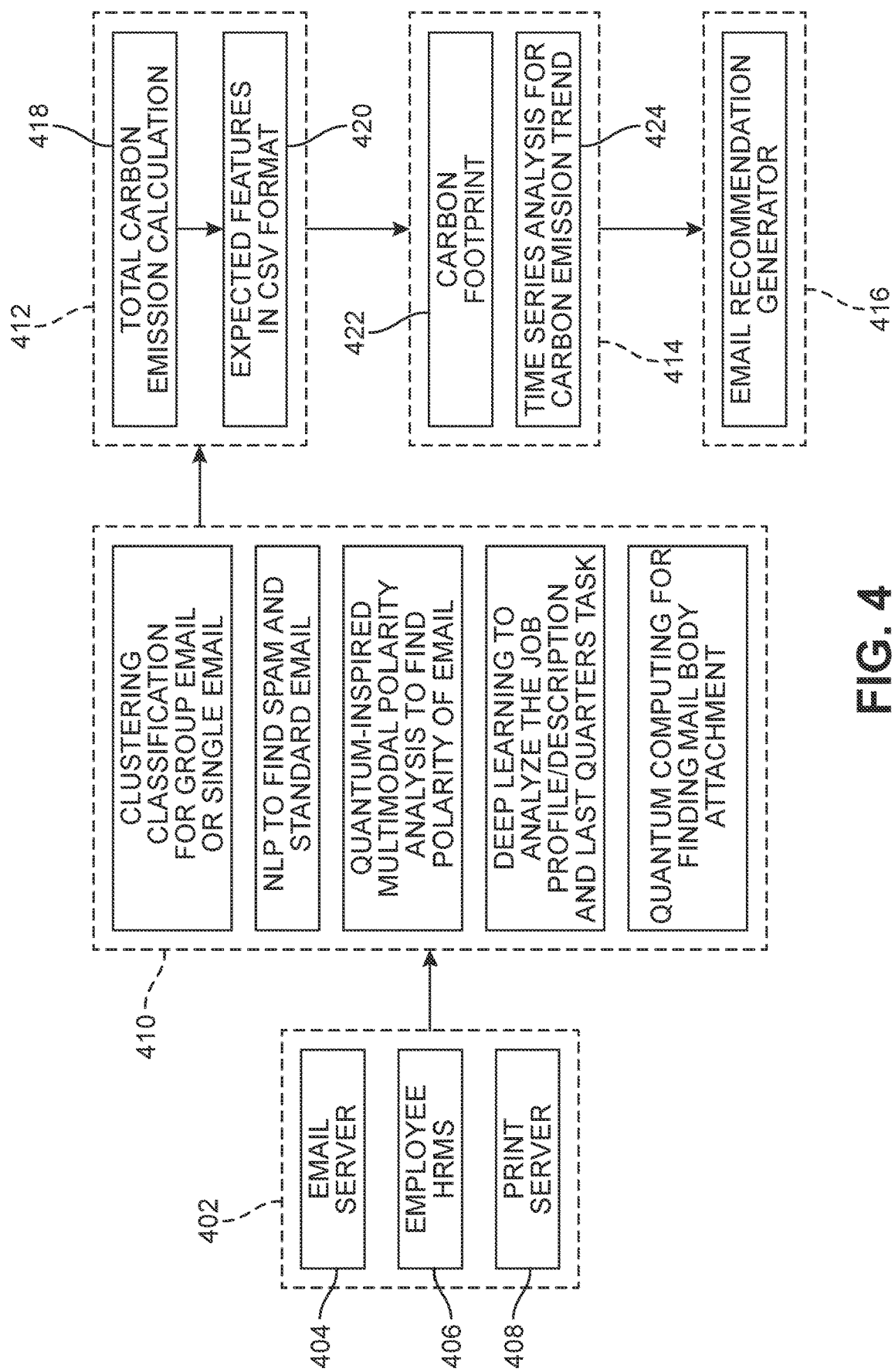
FIG. 4 is a schematic diagram of the general flow of data and processes of the machine learning and quantum computing based system for reducing carbon emissions by modifying emails, according to an embodiment.

FIG. 4 is a schematic diagram of the general flow of data and processes of the machine learning and quantum computing based system for reducing carbon emissions by modifying emails, according to an embodiment. FIG. 4 shows an example of various sources 402, including an email server 404, an employee Human Resources Management System (HRMS) 406, and a print server 408. Employee HRMS may include software systems that help manage internal human resources functions in an organization. Nonlimiting examples of a HRMS include Oracle Human Capital Management (HCM), SAP SuccessFactors HXM Suite, and ADP Workforce Now. In some embodiments, the HRMS may include a task management tool from which tasks may be extracted, for example, by the deep learning module. Email server 404 may provide email data, including draft emails, images of draft emails, and/or corresponding draft email metadata (e.g., attachment size, content, date, time, log data, etc.). In some embodiments, email server 404 may include a plurality of servers. HRMS 406 may provide various types of employee data. For example, employee data may include job profiles/descriptions, employee title, employee ID, department, worker type, time type, region, location, position details, job profile to derive functional area, employee organization hierarchy (e.g., manager, second level upline, team), project details, assignment start and end times, and current work items. Print server 408 may include data related to printer activity, such as print job data and employees corresponding to print jobs. At 412, these sources can provide input data that can undergo various types of operations at 410 to identify/extract features from input data and, at 412, to calculate the amount of carbon emissions that could be caused the draft email in its form at that moment, and can determine which features of the email can be modified to reduce the amount of carbon emissions caused by the draft email upon sending. The calculated amount of carbon emissions, as well as some of the extracted features (e.g., number of recipients and/or presence of files attached to draft email) can be used to determine recommendations for reducing the carbon emissions produced by sending the draft email at 416.

The various types of operations shown in FIG. 4 at 416 include clustering classification for group email address or single email address, NLP to find spam or standard email, quantum-inspired multimodal polarity analysis to find polarity of emails, deep learning to analyze job profile/description and last quarter's task, and quantum computing for finding mail body attachments. The various types of operations shown in FIG. 4 at 416 are exemplary and it is understood that other types of processes may be applied.

The extracted features from the input data can additionally be used to provide analytics at 414. For example, the analytics may include the carbon footprint of an individual employee and/or a department. The carbon footprint of an individual employee may include the total carbon emissions produced by the email activity of an individual employee during a predetermined period of time. The carbon footprint of department may include the total carbon emissions produced by the email activity of a department during a predetermined period of time. In some embodiments, the analytics may include a time series analysis of trends for carbon emissions 424 produced by the email activity of an individual employee and/or a department. For example, trends may include uptrend (i.e., higher than average carbon emissions over predetermined period of time), downtrend (i.e., lower than average carbon emissions over predetermined period of time), stationary trend (i.e., same as average/no appreciable change in carbon emissions over predetermined period of time), and seasonal trend (i.e., higher than average carbon emissions over identified period of time).

Figure 5:
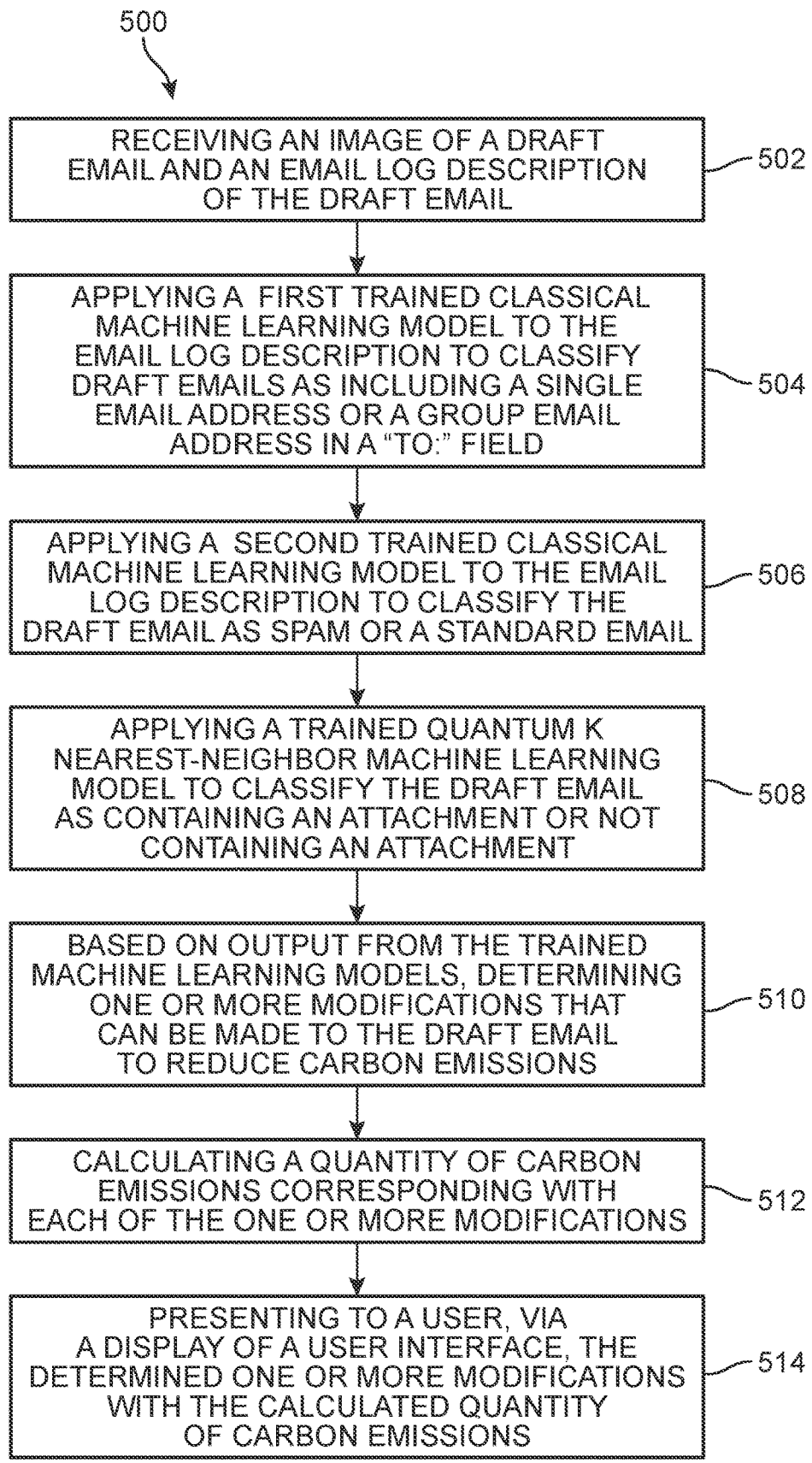
FIG. 5 shows a computer-implemented method for reducing carbon emissions by applying classical machine learning and quantum computing to modify emails, according to an embodiment.

FIG. 5 shows a computer-implemented method for reducing carbon emissions by applying classical machine learning and quantum computing to modify emails 500 (or method 500), according to an embodiment.

Method 500 may include receiving an image of a draft email and an email log description of the draft email (operation 502).

Method 500 may include applying a first trained classical machine learning model to the email log description to classify draft emails as including a single email address or a group email address in a "to:" field (operation 504). For example, as shown in FIG. 4, in some embodiments, first trained classical machine learning model applies clustering to the email log description to classify draft emails as including a single email address or a group email address in a "to:" field. Classification module 118 may perform operation 504.

Method 500 may include applying a second trained classical machine learning model to the email log description to classify the draft email as spam or a standard email (operation 506). For example, in some embodiments, the second trained classical machine learning model applies NLP to the email log description to classify the draft email as spam or a standard email. NLP module 116 may perform operation 506.

Method 500 may include applying a trained QKNN machine learning model to classify the draft email as containing an attachment or not containing an attachment (operation 508). QKNN module 124 may perform operation 508.

Method 500 may include, based on output from the trained machine learning models, determining one or more modifications that can be made to the draft email to reduce carbon emissions (operation 510).

Method 500 may include calculating a quantity of carbon emissions corresponding with each of the one or more modifications (operation 512).

Method 500 may include presenting to a user, via a display of a user interface, the determined one or more modifications with the calculated quantity of carbon emissions (operation 514).

Figure 6:
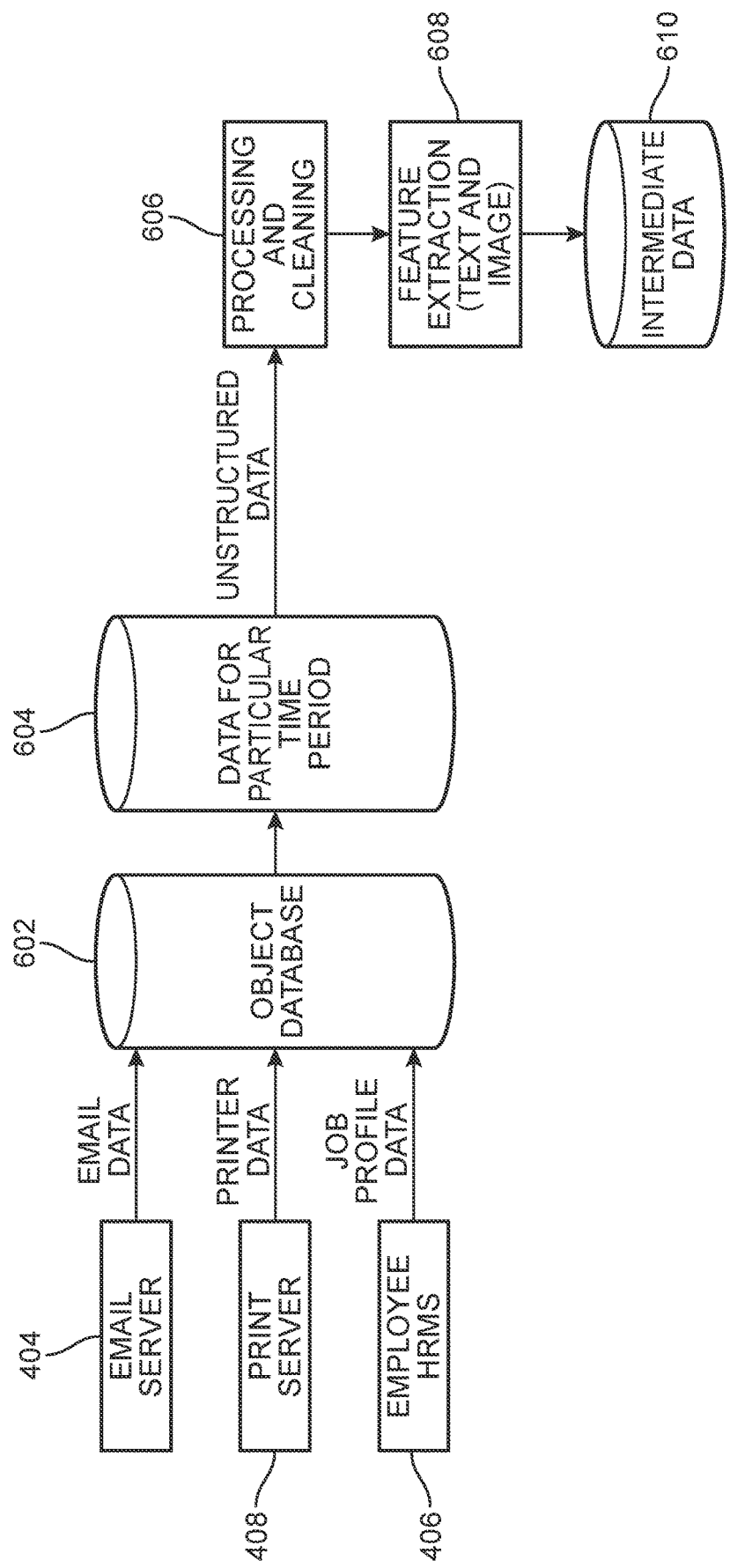
FIG. 6 shows an arrangement of databases and operations, according to an embodiment.

FIG. 6 shows an arrangement of databases and operations, according to an embodiment. In FIG. 6, an object database 602 may receive email data from the email server (e.g., Microsoft Outlook server), printer data from a print server (e.g., Domino print server), and job profile data from an HRMS. For example, in some embodiments, the object database may include an Amazon Simple Storage Service (Amazon S3) Bucket. In another example, the object database may include Azure Blob storage. Data stored in the object database may be sent to a database dedicated to data for particular time period. For example, in some embodiments, the database dedicated to data for particular time period 604 (or database 604) may include one or more time-series databases. Unstructured data from database 604 may be received and exploratory analysis may be performed on the unstructured data. As discussed in more detail below, unstructured data from database 604 may undergo cleaning and preprocessing at 606, and then may undergo feature extraction at 608 to transform the unstructured data into feature vectors (e.g., text feature vectors for text input and image feature vectors for image input). Variable reduction may be performed on the feature vectors by any known techniques to reduce the dimensionality of the feature space. The extracted features may be stored in an intermediate database 610. As discussed in further detail below, the extracted features may include text feature vectors and/or image feature vectors, depending upon the type of data analysis that is to be applied to the input data.

Figure 7:
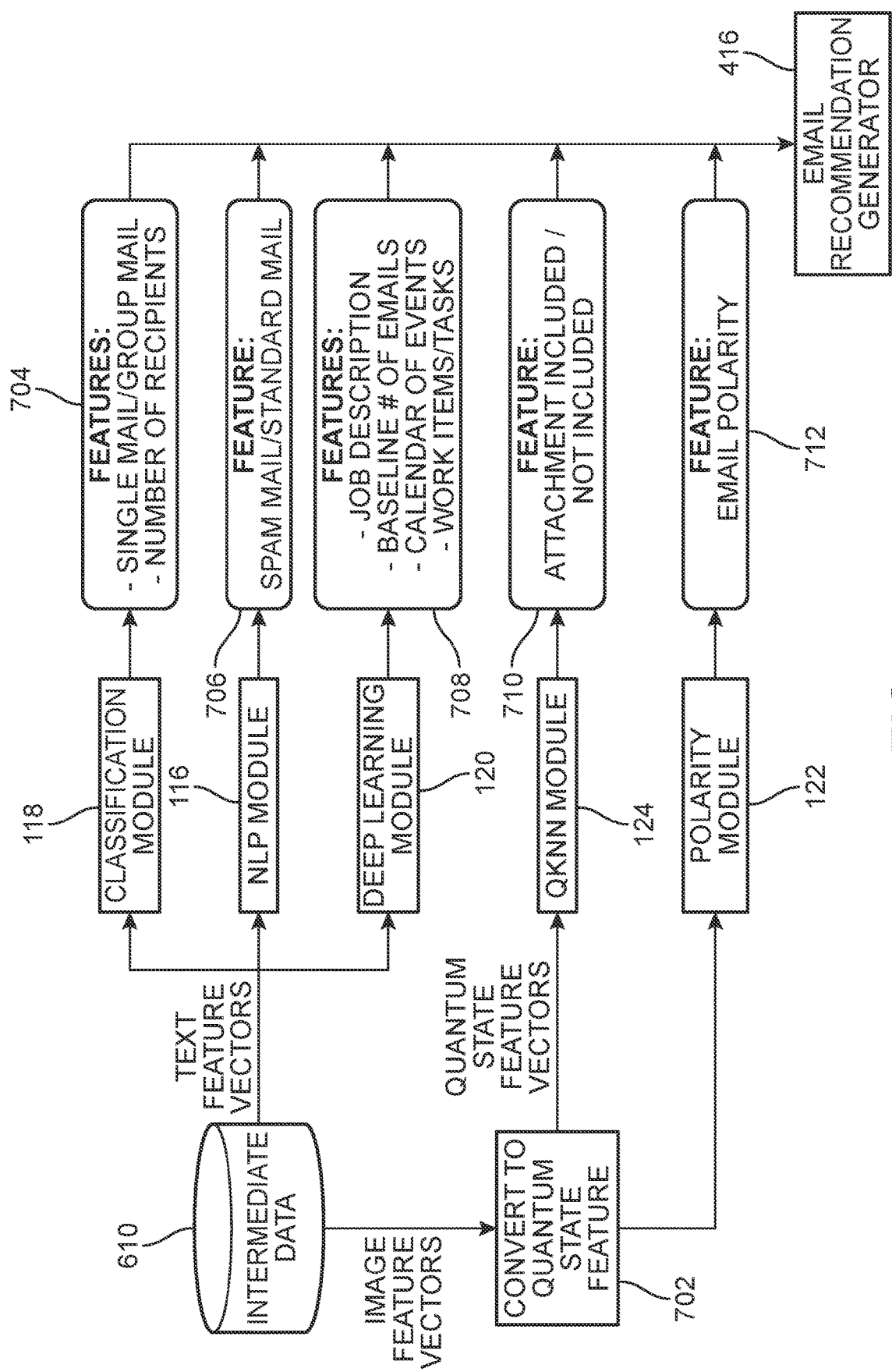
FIG. 7 shows the application of processes to extract features from log email descriptions of draft emails and images of draft emails, according to an embodiment.

As shown in FIGS. 6-7, the unstructured data may be provided by one or more servers (e.g., email servers) as input for analysis of the recipients of the draft email and whether or not the email is spam (i.e., unsolicited email sent to a large number of recipients, such as a junk email including a mass invitation). The unstructured data may include metadata of a draft email (e.g., log description of emails in comma-separated value (CSV) format). Nonlimiting examples of draft email metadata include attachment size, content, date, time, log data, etc.). This metadata may be provided as input for analysis of the recipients of the draft email and whether or not the email is spam (i.e., unsolicited email sent to a large number of recipients, such as a junk email including a mass invitation). The metadata may be provided as unstructured raw data (e.g., CSV format). Thus, the metadata may undergo one or more transformations to convert the data into a structured format for analysis. For example, as mentioned above, unstructured data from database 604 may undergo cleaning and preprocessing at 606. Nonlimiting examples of preprocesses include converting text lowercase, tokenizing the text, punctuation removal, stop word removal, lemmatization, and stemming. One or more preprocesses may be performed. In some embodiments, libraries designed to handle cleaning and preprocessing may be used to perform some or all of the cleaning and/or preprocessing. Nonlimiting examples of libraries that may be used for cleaning and preprocessing include Natural Language ToolKit (NLTK) and spacy. Cleaning and preprocessing may be performed on the text of the draft email metadata.

After cleaning and preprocessing at 606, the preprocessed draft email metadata may be converted to text feature vectors representing text (e.g., words and/or sentences) at 608. For example, in some embodiments, text from the emails that was previously tokenized can be converted to text feature vectors representing text. The method may include inputting the text feature vectors into both first classical machine learning model and the trained second classical machine learning model. Applying the first trained classical machine learning model to the email log description may include applying the first trained classical machine learning model to the text feature vectors. Applying the second trained classical machine learning model to the email log description includes applying the second trained classical machine learning model to the text feature vectors.

FIG. 7 shows the application of processes to extract features from log email descriptions of draft emails and images of draft emails, according to an embodiment. In this embodiment, the text feature vectors stored in intermediate database 610 may be input into various modules for analysis. For example, the data that has been converted into text feature vectors can be input into classification module 118, NLP module 116, and deep learning module 120. Data that has been converted to image feature vectors can be converted to quantum state features at 702 and may be input into QKNN module 124 and polarity module 122.

Classification module 118 may include a first trained classical machine learning model that can apply a classification process, such as clustering, to identify whether a single email address or a group of email addresses are included in the draft email at 704. If a group is included, other processes described below may determine the number of recipients included in the draft email. In some embodiments, the method may include training and testing a first classical machine learning model to classify draft emails including a single email address or a group email address in the "to:" field resulting in the first trained classical machine learning model. In some embodiments, the method may include training and testing the first machine learning classification model to classify email recipients as either single recipients or group recipients. For example, in some embodiments, training and testing datasets used to train the model may include individual recipient email addresses labeled as individual and group recipient email addresses (e.g., distribution group having a single email address that goes to the group and/or group name that can be used as shorthand for all of the email addresses included in the distribution group) as group. The first trained machine learning classification model can perform a first classification process to classify a draft email as having a single recipient or a group of recipients. For example, in some embodiments, the first trained machine learning classification model can compare the feature vector of the email address(es) and/or name(s) included in the preprocessed draft email metadata with the feature vectors of labeled email address(es) and/or name(s) from the labeled dataset to determine which cluster the email address(es) and/or name(s) included in the preprocessed draft email metadata belong in.

In some embodiments, the first machine learning classification process may include clustering techniques, such as k-means clustering or density based clustering. The first trained classical machine learning model may be applied to the preprocessed draft email metadata to determine whether the draft email includes one or more recipients. In other words, the first machine learning classification process can determine if a draft email includes a single recipient or a group of recipients and assign the draft email to the corresponding class.

In some embodiments, PySpark may be a computing framework and set of libraries used to perform the classification process. In some embodiments, Apache Spark Machine Learning Library is a library that may be used to perform the classification process. Databricks Spark Cluster is a nonlimiting example of a set of computation resources and configurations that may be used to perform the classification process.

The method may include determining the number of recipients included in a group email address. For example, the preprocessed draft email metadata (e.g., attachment size, content, date, time, log data, etc.) or the draft email itself (including the "to:" field, "subject" field, body, signature, etc.) may include multiple email addresses and/or names (e.g., individual names or group distribution names). In such a situation, the number of recipients included in the preprocessed draft email metadata can be obtained by running a script. For example, a built-in function of Python may be performed to obtain the number of recipients. Sample code from such a built-in function to parse an email is as follows:

```
from email.parser import BytesParser
from itertools import chain
msg = b'''
'''.strip( )
email = BytesParser( ).parsebytes(msg)
for recipient in getaddresses(
    chain(email.get_all('to', [ ]), email.get_all('cc', [ ]),
    email.get_all('bcc', [ ]))):
    print('The recipient is: ', recipient)
```

Then, an additional script can be used to the count of number of recipients identified by the above script. For example, a built-in function from spaCy library called "LIKE_URL"

can be used to detect if the data has a URL link in it or not. Sample code from such a built-in function is as follows:

```
import spacy
nlp = spacy.load("en_core_web_sm")
text = 'email is xxxx.xxxxxx@accenture.com'
doc = nlp(text)
for token in doc:
    if token.like_url:
        print(token)
```

This built-in function can provide the identity of recipients that email address/identity is internal/external by matching tokens.

In another example, when the draft email metadata includes a distribution group identified by a single email address that is connected to multiple email addresses in the distribution group, a program may be used to the number of recipients included in the distribution group.

NLP module 116 may include a second trained classical machine learning model that applies a natural language process to determine whether the draft email is a spam email or a standard email at 706. In some embodiments, the method can include training and testing a second classical machine learning model to classify draft emails as spam or standard emails resulting in the second trained classical machine learning model. For example, in some embodiments, training and testing datasets used to train the model may include email metadata (e.g., email log description) labeled as spam and email metadata (e.g., email log description) labeled as standard. The second trained machine learning classification model can perform a second classification process (e.g., NLP) to classify a draft email as spam or standard. For example, in some embodiments, the second trained machine learning classification model can compare the feature vector of email metadata (e.g., email log description) with the feature vector of a labeled email metadata (e.g., email log description).

The second machine learning classification process may be applied to the preprocessed draft email metadata (e.g., email log description) to determine whether the draft email is spam or standard. Spam emails may include emails that are unsolicited and sent to a large number of recipients. Standard emails may include all other emails. Typically, standard emails are more tailored to recipients than spam emails. Because spam emails are unsolicited, these emails are often unwelcomed by the recipient, and are, therefore, wasteful.

Deep learning module 120 may apply deep learning to data obtained from an HRMS to determine the job profile/ description, the baseline number of emails (e.g., expected for job profile), calendar of events, and work items/tasks associated with an individual employee at 708.

QKNN module 124 may apply a trained QKNN model to determine whether the draft email includes an attachment. In some embodiments, the method may include training and testing a QKNN machine learning model to classify an email as containing an attachment or not containing an attachment resulting in the trained QKNN machine learning model training. Classified images (e.g., images of emails classified as having attached files or not having attached files) may be used as training images and unclassified images may be used as test images. The test images may be classified according to training images.

Referring to FIG. 6, email server 404 may provide emails and draft emails. The method may include capturing an image of the draft email, for example, from email server 404. The method may include applying feature extraction of the image of the draft email to convert the image to image feature vectors (e.g., color and texture feature vectors) at 608. This conversion may be performed by a classical computer. The image feature vectors may be stored in intermediate database 610. The method may include converting the image feature vectors to quantum state features at 702 and inputting the quantum state features into QKNN module 124. In other words, the feature vectors extracted using a classical computer can be stored in quantum superposition states, which can be used to achieve parallel computing of similarity. Next, a quantum minimum search algorithm may be applied. In comparison to classical computing, this quantum computing process can speed up searching process for similarity distance between the test image and the training images. Finally, the image may be classified, by quantum measurement, as a draft email with an attachment or a draft email not having an attachment. The measurement step is executed only once to ensure the validity of the scheme. The k minimum distances can be obtained from quantum superposition states, and indexes of the k similar images are obtained by measurement and the final classification result can be produced by majority voting. The system and method may include any techniques or components described in the following, which is incorporated by reference in its entirety: Yijie Dang, Nan Jiang, Hao Hu, Zhuoxiao Ji, Wenyin Zhang. 2018. Image Classification Based on Quantum KNN Algorithm. arXiv: 1805.06260 [cs.CV] (available at https://arxiv.org/pdf/1805.06260v1.pdf).

In some embodiments, image processing of the images of draft emails may be performed prior to QKNN analysis. Image processing may include digitization, quantization, compression, enhancement, restoration, and/or image segmentation. Digitization is the imaging or scanning by converting hard-copy/non-digital, records into digital format. Quantization is the transition between continuous values of the image function and its digital equivalent is referred to as quantization. It makes a signal truly digital and ready for processing by a computer. Compression is the process of encoding or converting an image file in such a way that it consumes less space than the original file without affecting or degrading its quality to a greater extent. Enhancement is adjusting digital images so that the results are more suitable for display or further image analysis. For example: remove noise, sharpen, or brighten an image, making it easier to identify key features. Restoration is the process of reconstructing or recovering an image that has been degraded by using a priori knowledge of the degradation phenomenon. So, it is the inverse process in order to recover the original image. Image Segmentation is the process of partitioning a digital image into multiple segments (sets of pixels, also known as image objects). It can simplify and/or change the image into a more meaningful and easier to analyze form.

In some embodiments, the method can include determining the resolution of attachments (e.g., images, videos, etc.) and displaying the carbon emissions corresponding to the resolution of attachments, as well as the carbon emissions corresponding to a reduced resolution to inform a user how reducing the resolution can reduce the carbon emissions caused by the attachment.

Polarity module 122 may apply quantum-inspired multimodal polarity analysis to text of body of draft email to determine the polarity of the draft email at 712. A non-limiting example for determining polarity includes applying quantum-inspired multimodal polarity analysis. The method may include any of the techniques described in the following, which is hereby incorporated by reference in its entirety: Qiuchi Li, Sagar Uprety, Benyou Wang, and Dawei Song. 2018. Quantum-Inspired Complex Word Embedding. In Proceedings of the Third Workshop on Representation Learning for NLP, pages 50-57, Melbourne, Australia. Association for Computational Linguistics.

The features extracted by the modules may be input into email recommendation generator 714, where recommendations may be generated based on the features. For example, in some embodiments, the recommendation generator can generate a recommendation based on the number of recipients included in a draft email, the presence of an attachment in a draft email, and/or the identity of the recipient(s). The system and method can present the user with a selection to have the draft email automatically modified according to recommendations generated by the recommendation generator to reduce carbon emissions.

In an example situation, an email thread may have started with an initial email communicating to a group of recipients about an immediate problem that needs to be solved. In this situation, the recipients may be the employees impacted by the immediate problem and other employees belonging to a department tasked with solving the immediate problem. Over time, the initial email may be replied to multiple times until the immediate problem is resolved. After the immediate problem is resolved, a final email may be sent to the entire group included in the initial email. The final email may be related to a long term solution that is unrelated to the employees impacted by the immediate problem of the initial email. Thus, since the final email is related to a long term solution specific to a certain department and unrelated to the employees impacted by the immediate problem of the initial email, it is unnecessary and wasteful to send the final email to such employees. The disclosed system and method can help in this situation by analyzing draft reply emails sent in this thread. For example, analysis of the final draft email by the present system and method may reveal the polarity (which is indicative of the priority of the draft email) of the final draft email independently and in relation to the previous emails in the same thread, as well as the identities of the recipients included in the final draft email (including the departments of the recipients). This information can be used as the basis of decision making by the email recommendation generator to identify that the thread had an initial severity of the immediate problem and the severity (and/or priority) diminished as the problem was being resolved/continuous improvement was discussed in the thread. The email recommendation generator can determine that the draft final email is not relevant to all of the recipients listed in the draft final email and can recommend removal of such recipients. The email recommendation generator may also consider employee information extracted from the HRMS, such as the sender's work area and job profile, to call out the groups/individuals listed as recipients that the email may no longer be relevant to in order to optimize the number of recipients.

Figure 8:
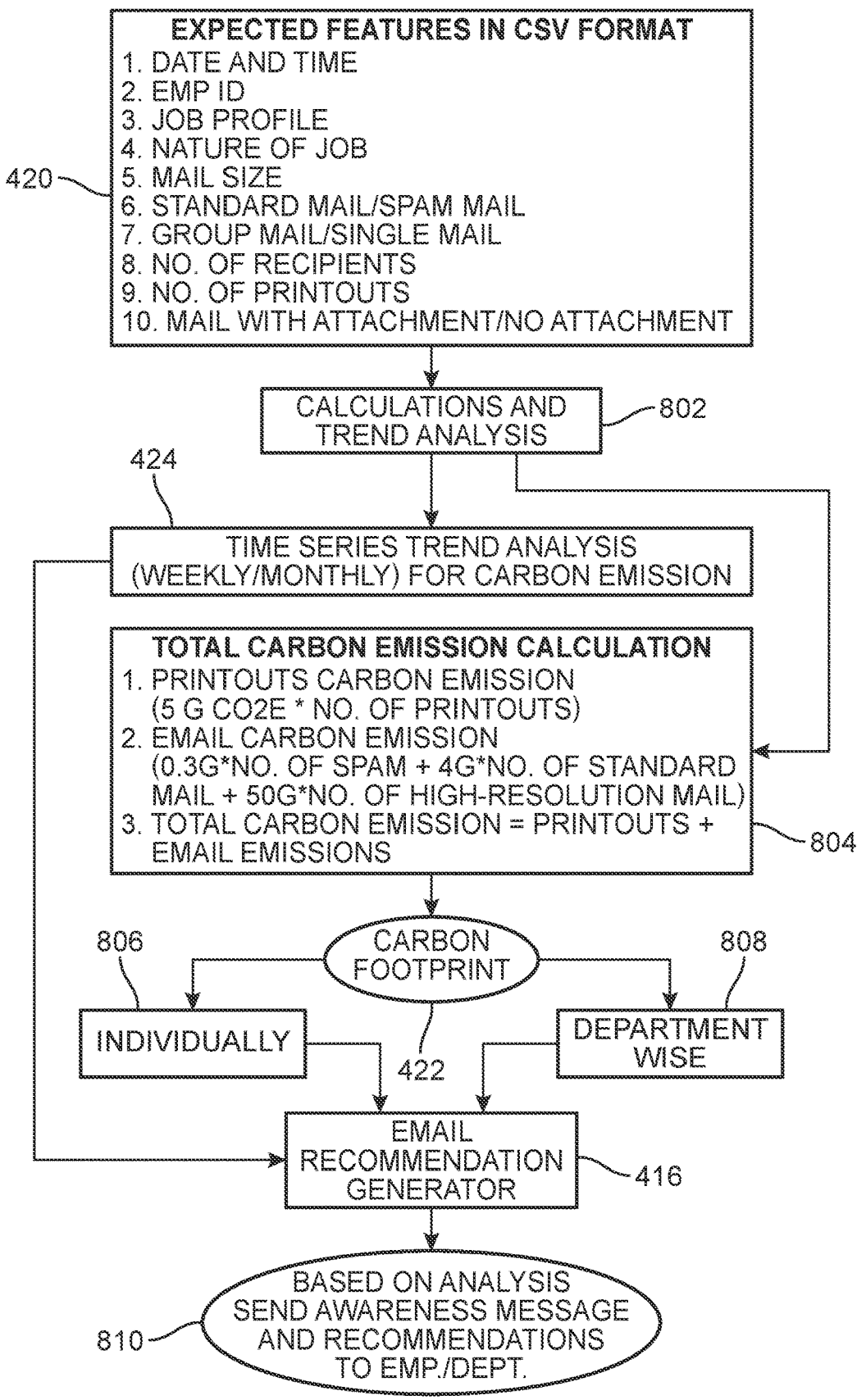
FIG. 8 depicts details of calculations made based on the extracted features, according to an embodiment.

FIG. 8 depicts details of calculations made based on the extracted features, according to an embodiment. FIG. 8 shows how the method may include compiling extracted features, calculating carbon emission data and trends based on the extracted features at 802, and generating recommendations for reducing carbon emissions, as well as generating visualizations/dashboards of carbon emissions analytical data. The method may include compiling the features extracted from the various inputs into a structured format, such as a CSV format or a table at 420. Nonlimiting examples of extracted features include the data and time of a draft email, the employee identification associated with email address for the sender, job profile of the sender, nature of the sender's job, draft email size, standard mail/spam email, group email/single email, number of recipients, number of printouts, number of attachments, and/or image pattern of attachment(s). In some embodiments, these extracted features may be extracted by the operations discussed above with respect to FIG. 7.

Calculating carbon emissions based on the extracted features may include calculating the carbon emissions associated with a draft email, a sender of a draft email, and/or a department of a sender of an email based on extracted features of the draft email and/or extracted features from an HRMS at 802. Calculating trends based on the extracted features may include a time series analysis of trends for carbon emissions produced by the email activity of an individual employee and/or a department. The trends can include an uptrend, downtrend, stationary trend, and seasonal trend. At 424, a time series analysis for carbon emissions trend may be performed for a predetermined period of time (e.g., daily, weekly, monthly).

Calculating carbon emissions per employee may include calculating carbon emissions caused by printouts printed by an employee (e.g., number of printouts provided by print server 408) by multiplying a number of printouts by an average amount of carbon emissions caused by a single page/printout (e.g., 5 g of carbon dioxide ($CO_2$). Calculating carbon emissions per employee may include calculating carbon emissions caused by emails by multiplying a number of emails sent by the employee by an average amount of carbon emissions caused by a single email (e.g., 0.3 g of $CO_2$ for spam, 4 g. for standard mail, and 50 g. for high-resolution email). Calculating carbon emissions per employee may include calculating total carbon emissions per employee by adding together the carbon emissions caused by printouts and the carbon emissions caused by emails at 804. The total carbon emissions are the carbon footprint 422. The total carbon emissions, or carbon footprint, of a department can be calculated by adding all of the individual employee carbon footprints of a department together at 808. Or the total carbon emissions, or carbon footprint, of a department can be calculated by calculating carbon emissions caused by printouts printed by the department and the emissions caused by emails sent by the department, and adding the two together.

Calculating carbon emissions per department may include calculating carbon emissions caused by printouts printed by the department by multiplying a number of printouts by an average amount of carbon emissions caused by a single page/printout (e.g., 5 g of carbon dioxide ($CO_2$). Calculating carbon emissions per department may include calculating carbon emissions caused by emails by multiplying a number of emails sent by the department by an average amount of carbon emissions caused by a single email (e.g., 0.3 g of $CO_2$ for spam, 4 g. for standard mail, and 50 g. for high-resolution email). Calculating carbon emissions per department may include calculating total carbon emissions per department by adding together the carbon emissions caused by printouts and the carbon emissions caused by emails at 804.

The individual carbon footprint and/or department wise carbon footprint may be input into email recommendation generator 416 to generate recommendations for reducing carbon emissions caused by a draft email. These recommendations may be based on features of the email that cause the calculated level of carbon emissions and identifying the highest contributing features, as well as specific actions for reducing the contribution of these features (e.g., removing the number of recipients or attachments). These draft email recommendations may be displayed to the sender of the draft email at 810.

The individual carbon footprint and/or department wise carbon footprint may be input into email recommendation generator 416 to generate recommendations for reducing carbon emissions caused by emails in general. For example, if the trend analysis determines that a department sends emails with many attachments as attached files, a recommendation may be to replace these types of attachments with links to the same files saved in shared locations. These department recommendations may be displayed to the members of a department at 810.

FIG. 9 shows an Individual Employee Data Table 900 (Table 900). This table is an example of a display of analytics, according to an embodiment. The table includes data for individual employees associated with an email sent. The columns shown in the embodiment of FIG. 9 include employee identification number, employee name, the date and time the email was sent, the department that the employee belongs to, the email size, whether the mail was spam or standard, whether the email was sent to a group or a single recipient, the number of recipients, whether the email includes an attachment, the number of printouts of the email after it was sent, and the employee's job profile. The data in Table 900 may be extracted from the HRMS.

FIG. 10 is a display of analytics, according to an embodiment. FIG. 10 shows Individual Employee Carbon Footprint Table 1000 (or Table 1000). Table 1000 may include an employee's ID, an employee's name, the date of the data, the department of the individual employee, and the individual employee's carbon footprint. The data in Table 1000 may be extracted from the HRMS, may be extracted from Table 900, and/or may be calculated by operations discussed with respect to FIG. 8.

FIG. 11 is a display of analytics, according to an embodiment. FIG. 11 shows Individual Employee Trends Table 1100 (or Table 1100). Table 1100 may include an employee's ID, the month considered for trends, the carbon footprint of the employee during the same month, and the trend for the same month. The data in Table 1100 may be extracted from the HRMS, may be extracted from Table 900, and/or may be calculated by operations discussed with respect to FIG. 8.

FIG. 12 is a display of analytics, according to an embodiment. FIG. 12 shows Department Employee Trends Table 1200 (or Table 1200). Table 1100 may include department, the month considered for trends, the carbon footprint of the department during the same month, and the trend for the same month. The data in Table 1200 may be extracted from the HRMS, may be extracted from Table 900, and/or may be calculated by operations discussed with respect to FIG. 8.

Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method for applying machine learning and quantum computing to generate carbon emissions for emails and modifying emails to reduce carbon emissions, the method comprising:
- receiving an image of a draft email and an email log description of the draft email;
- training a first classical machine learning model to classify draft emails including a single email address or a group email address in the "to:" field resulting in the first trained classical machine learning model;
- applying the first trained classical machine learning model to the email log description to classify the draft emails as including the single email address or the group email address in the "to:" field;
- training a second classical machine learning model to classify the draft emails as spam or standard emails resulting in the second trained classical machine learning model;
- applying the second trained classical machine learning model to the email log description to classify the draft email as spam or a standard email;
- training a QKNN machine learning model to classify an email as containing an attachment or not containing an attachment resulting in the trained QKNN machine learning model;
- applying the trained quantum K nearest-neighbor (KNN) machine learning model to classify the draft email as containing the attachment or not containing the attachment;
- based on output from the first trained classical machine learning model, the second trained classical machine learning model, and the trained QKNN machine learning model, determining one or more modifications that can be made to the draft email to reduce carbon emissions;
- calculating a quantity of carbon emissions corresponding with each of the one or more modifications; and
- presenting to a user, via a display of a user interface, the determined one or more modifications with the calculated quantity of carbon emissions.

2. The method of claim 1, further comprising:
- converting text of the email log description to text feature vectors;
- inputting the text feature vectors into both first classical machine learning model and the trained second classical machine learning model, wherein applying the first trained classical machine learning model to the email log description includes applying the first trained classical machine learning model to the text feature vectors; and
- applying the second trained classical machine learning model to the email log description includes applying the second trained classical machine learning model to the text feature vectors.

3. The method of claim 2, further comprising:
- prompting the user to select at least one of determined one or more modifications; and
- upon selection of the at least one of determined one or more modifications, automatically implementing the modification to the draft email.

4. The method of claim 1, wherein at least one of the determined one or more modifications is removal of one or more recipients in the draft email, further comprising:
- modifying the draft email by removing one or more recipients in the draft email "to:" field; and
- upon modification of the draft email, presenting to a user, via a display of a user interface, an amount of carbon emissions conserved by this removal and/or the quantity of carbon emissions corresponding to the modified draft email.

5. The method of claim 1, wherein at least one of the determined one or more modifications is removal of one or more attachments in the draft email and replacing the removed attachments with a link to a shared location where files from the one or more attachments are saved.

6. The method of claim 5, further comprising:
- modifying the draft email by removing one or more attachments in a draft email and replacing the removed attachments with a link to a shared location where files from the one or more attachments are saved; and
- upon modification of the draft email, presenting to a user, via a display of a user interface, an amount of carbon emissions conserved by this removal and replacement of the one or more attachments and/or the quantity of carbon emissions corresponding to the modified draft email.

7. A non-transitory computer-readable medium storing software comprising instructions executable by one or more computers which, upon such execution, cause the one or more computers to:
- receive an image of a draft email and an email log description of the draft email;
- train a first classical machine learning model to classify draft emails including a single email address or a group email address in the "to:" field resulting in the first trained classical machine learning model;
- apply the first trained classical machine learning model to the email log description to classify the draft emails as including the single email address or the group email address in the "to:" field;
- train a second classical machine learning model to classify the draft emails as spam or standard emails resulting in the second trained classical machine learning model;
- apply a second trained classical machine learning model to the email log description to classify the draft email as spam or a standard email;
- train a QKNN machine learning model to classify an email as containing an attachment or not containing an attachment resulting in the trained QKNN machine learning model;
- apply the trained quantum K nearest-neighbor (QKNN) machine learning model to classify the draft email as containing the attachment or not containing the attachment;
- based on output from the first trained classical machine learning model, the second trained classical machine learning model, and the trained QKNN machine learning model, determine one or more modifications that can be made to the draft email to reduce carbon emissions;
- calculate a quantity of carbon emissions corresponding with each of the one or more modifications; and
- present to a user, via a display of a user interface, the determined one or more modifications with the calculated quantity of carbon emissions.

8. The non-transitory computer-readable medium storing software of claim 7, wherein the instructions further cause the one or more computers to:
- convert text of the email log description to text feature vectors;
- input the text feature vectors into both first classical machine learning model and the trained second classical machine learning model, wherein applying the first trained classical machine learning model to the email log description includes applying the first trained classical machine learning model to the text feature vectors; and apply the second trained classical machine learning model to the email log description includes applying the second trained classical machine learning model to the text feature vectors.

9. The non-transitory computer-readable medium storing software of claim 7, wherein the instructions further cause the one or more computers to:

prompt the user to select at least one of determined one or more modifications; and upon selection of the at least one of determined one or more modifications, automatically implement the modification to the draft email.

10. The non-transitory computer-readable medium storing software of claim 7, wherein at least one of the determined one or more modifications is removal of one or more recipients in the draft email.

11. The non-transitory computer-readable medium storing software of claim 7, wherein at least one of the determined one or more modifications is removal of one or more attachments in the draft email and replacing the removed attachments with a link to a shared location where the files from the one or more attachments are saved.

12. The non-transitory computer-readable medium storing software of claim 11, wherein the instructions further cause the one or more computers to:

modify the draft email by removing one or more attachments in a draft email and replacing the removed attachments with a link to a shared location where the files from the one or more attachments are saved; and upon modification of the draft email, present to a user, via a display of a user interface, an amount of carbon emissions conserved by this removal and replacement of the one or more attachments and/or the quantity of carbon emissions corresponding to the modified draft email.

13. A machine learning and quantum computing based system for reducing carbon emissions by modifying emails, the system comprising one or more computers and one or more storage devices storing instructions that are operable, when executed by the one or more computers, to cause the one or more computers to:

receive an image of a draft email and an email log description of the draft email;

train a first classical machine learning model to classify draft emails including a single email address or a group email address in the "to:" field resulting in the first trained classical machine learning model;

apply the first trained classical machine learning model to the email log description to classify the draft emails as including the single email address or the group email address in a "to:" field;

train a second classical machine learning model to classify draft emails as spam or standard emails resulting in the second trained classical machine learning model;

apply the second trained classical machine learning model to the email log description to classify the draft email as spam or a standard email;

train a QKNN machine learning model to classify an email as containing an attachment or not containing an attachment resulting in the trained QKNN machine learning model apply the trained quantum K nearest-neighbor (QKNN) machine learning model to classify the draft email as containing the attachment or not containing the attachment;

based on output from the first trained classical machine learning model, the second trained classical machine learning model, and the trained QKNN machine learning model, determine one or more modifications that can be made to the draft email to reduce carbon emissions;

calculate a quantity of carbon emissions corresponding with each of the one or more modifications; and present to a user, via a display of a user interface, the determined one or more modifications with the calculated quantity of carbon emissions.

14. The system of claim 13, wherein the instructions further cause the one or more computers to:

convert text of the email log description to text feature vectors;

input the text feature vectors into both first classical machine learning model and the trained second classical machine learning model, wherein applying the first trained classical machine learning model to the email log description includes applying the first trained classical machine learning model to the text feature vectors; and apply the second trained classical machine learning model to the email log description includes applying the second trained classical machine learning model to the text feature vectors.

15. The system of claim 13, wherein the instructions further cause the one or more computers to:

prompt the user to select at least one of determined one or more modifications; and upon selection of the at least one of determined one or more modifications, automatically implement the modification to the draft email.

16. The system of claim 13, wherein at least one of the determined one or more modifications is removal of one or more recipients in the draft email.

17. The system of claim 16, wherein at least one of the determined one or more modifications is removal of one or more attachments in the draft email and replacing the removed attachments with a link to a shared location where the files from the one or more attachments are saved.

* * * * *